United States Patent [19]

Wahlmann et al.

[11] 4,398,751
[45] Aug. 16, 1983

[54] SHOULDER LEVEL LINK POINT FOR VEHICLE SAFETY BELT

[75] Inventors: Ernst Wahlmann, Meerbeck; Willi Schottker, Nordsehl, both of Fed. Rep. of Germany

[73] Assignee: P.A. Rentrop, Hubbert & Wagner Fahrzeugausstattungen, Stadthagen, Fed. Rep. of Germany

[21] Appl. No.: 260,925

[22] Filed: May 6, 1981

[30] Foreign Application Priority Data

May 14, 1980 [DE] Fed. Rep. of Germany ....... 3018442

[51] Int. Cl.³ ............................................. B60R 21/10
[52] U.S. Cl. .................................... 280/808; 297/486
[58] Field of Search ............... 280/801, 802, 804, 808; 297/483, 468, 486

[56] References Cited

U.S. PATENT DOCUMENTS

| | | | |
|---|---|---|---|
| 3,964,798 | 6/1976 | Burleigh | 280/808 |
| 4,091,508 | 5/1978 | Yamada et al. | 280/808 |
| 4,135,737 | 1/1979 | Scholz et al. | 280/808 |
| 4,311,323 | 1/1982 | Provensal | 280/808 |

*Primary Examiner*—Richard A. Bertsch
*Attorney, Agent, or Firm*—Penrose Lucas Albright

[57] ABSTRACT

A vehicle safety belt link point assembly for attachment to a pillar of the vehicle at a location adjacent the shoulder of a vehicle occupant, includes a slotted guide with one link provided with a series of locking openings. The guide is secured to the pillar. A slide member is mounted on the guide and has one limb lying adjacent and parallel to the limb of the guide. The slide member limb has one opening which can be made coincident with any of the openings of the guide member limb. A slide piece carries a link point for receiving the belt webbing and is movable in the slot of the guide. A link is movable with the slide piece and carries a projection which can engage in a selected opening of the guide limb and with the opening of the slide member to lock the device.

6 Claims, 6 Drawing Figures

SHOULDER LEVEL LINK POINT FOR VEHICLE SAFETY BELT

BACKGROUND OF THE INVENTION

1. Field of the Invention

The invention relates to a device for the adjustment of a link point of a safety belt arranged adjacent the shoulder of a vehicle occupant.

2. Description of the Prior Art

In a prior proposal a tapped bore is provided in a slide piece movable in a guide mounted within the vehicle, into which is screwed a bolt capable of coupling a slide member with the slide piece and the adjustment and locking of the slide member is effected by means of a key-operated locking device, which locking device engages, in the locked condition of the slide member, in one locking opening of a series of openings which is provided in one limb of the guide, the guided locking device being subject to the action of a return spring, actuable substantially normally to the direction of movement of the slide member and connected therewith. The locking device, having the form of a flat circular disc, is connected with the key by a comparatively thin pin, which is guided in one angled leg of the slide member of substantially U-shaped cross-section, this angled leg ending in lugs which are anchored in the key. The locking device having the shape of a flat circular disc engages, in the locked configuration of the slide member in a substantially semi-circular shaped lock opening of a series of openings, which is provided in one limb of the guide.

This prior device has inter alia the disadvantage that as a result of insufficient guidance, tilting of the locking device can occur, as a result of which the easy passage through the locking openings and thus a satisfactory operation of the locking device becomes open to doubt. Furthermore, particularly at high stresses, for example in road accidents and the like, the single limb in which the lock openings are formed is liable to fail. The direct result of this is release of the locking device from its locking opening, so that the safety belt can no longer fulfil its function.

One object of the invention is to provide a device for the adjustment of the link point of a safety belt which is so constructed that tilting of the locking device during adjustment cannot occur.

Another object of the invention is to provide a device for the adjustment of the link point of a safety belt which is so constructed that the risk of the locking device being damaged during an accident is appreciably reduced.

SUMMARY OF THE INVENTION

According to the present invention, there is provided a device for the adjustment of a link point of a safety belt arranged adjacent the shoulder of a vehicle occupant comprising, a slide member having an angled leg with a locking opening therein, an adjustably lockable link point carried by the slide member, a guide mounted within the interior of the vehicle, receiving the link point and having a limb with a series of openings therein, a slide piece movable in the guide and having a tapped bore therein, a bolt screwed in the tapped bore which connects together the slide member and the slide piece, a locking device to effect the adjustment and locking of the slide member, a return spring biasing the locking device to the locked configuration, said locking device being movable substantially perpendicularly to the direction of the movement of the slide member and being connected with the latter, and engaging, in the locked configuration of the slide member in one lock opening of said series of openings, and a link movable in the slide member and carrying the locking device which latter in the locked configuration also engages in the said lock opening in the angled leg of the slide member, said angled leg of the slide member engaging over the limb of the guide and lying substantially parallel to the latter and for the guidance of the locking device a respective guide surface is provided on the slide piece and a guide surface is provided on the link.

Preferably elongated holes are provided in the link, by which respective pegs connected with the slide member are guided, which pegs engage positively in bores on both sides of the tapped bore provided in the slide piece.

In a further construction of the device in accordance with the invention, a projection is provided on the link which is guided by a slot in the slide member, which projection serves for mounting one section of a two-part return spring.

In order still further to improve the ease of movement of the link and thus of the locking device, an insert of synthetic resin or the like may be arranged between the link and the slide member and/or between the slide piece and the link.

BRIEF DESCRIPTION OF THE DRAWINGS

FIG. 1 of the drawings shows an elevation of the device for the adjustment and locking of a link point of a safety belt in a vehicle, the link point lying adjacent the shoulder of a vehicle occupant. In the illustrated embodiment the link point takes the form of a shackle 1 with a slot 2, through which passes the safety belt web, not further illustrated in the drawings for the sake of clarity. In order to adapt the length of the safety belt web to the size and configuration of the vehicle occupant, a device for the adjustment and locking of the link point is necessary. The shackle 1 is connected with a slide member 3 and is mounted within the interior of the vehicle, for example on a coachwork pillar disposed adjacent the shoulder of the occupant through the intermediary of a mounting guide 4 on which it is adjustably lockable. The guide 4 is secured for example by bolts which pass through bores 5, 6 of the guide 4.

Figure 1:
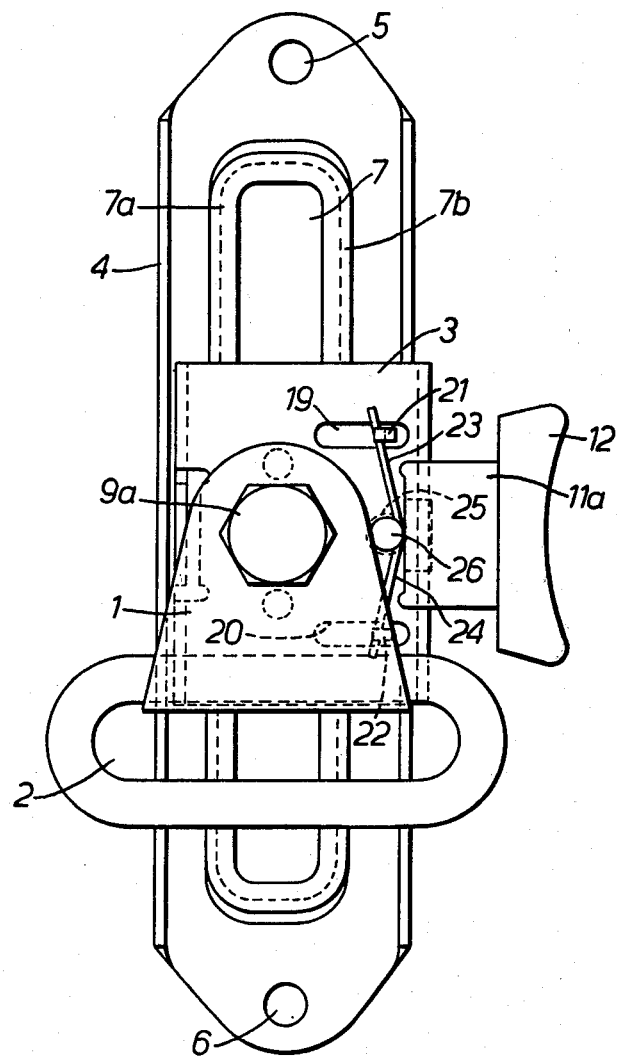
FIG. 1 is an elevation of an adjustment and locking device according to the invention for incorporation in a vehicle safety belt assembly.
Figure 2:
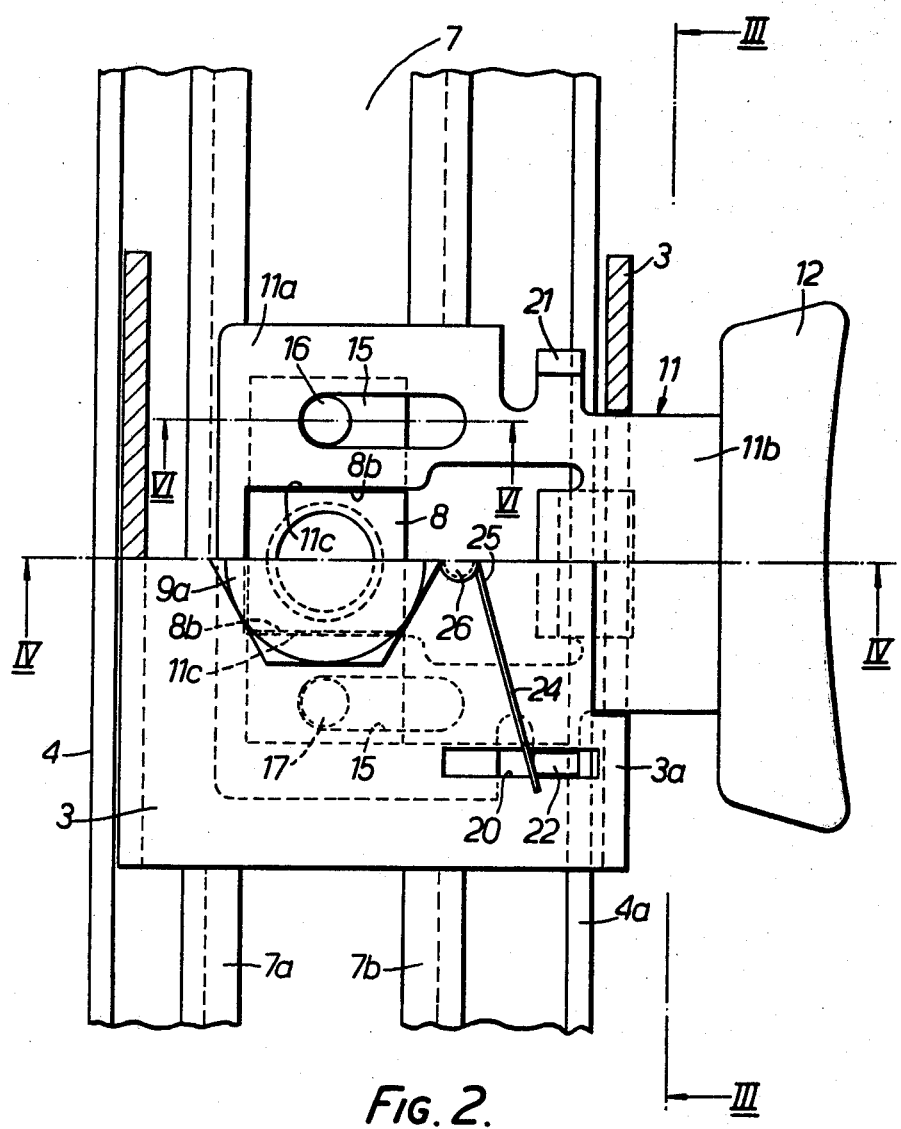
FIG. 2 is a fragmentary elevation, partly in section and to an enlarged scale of the device of FIG. 1.
Figure 3:
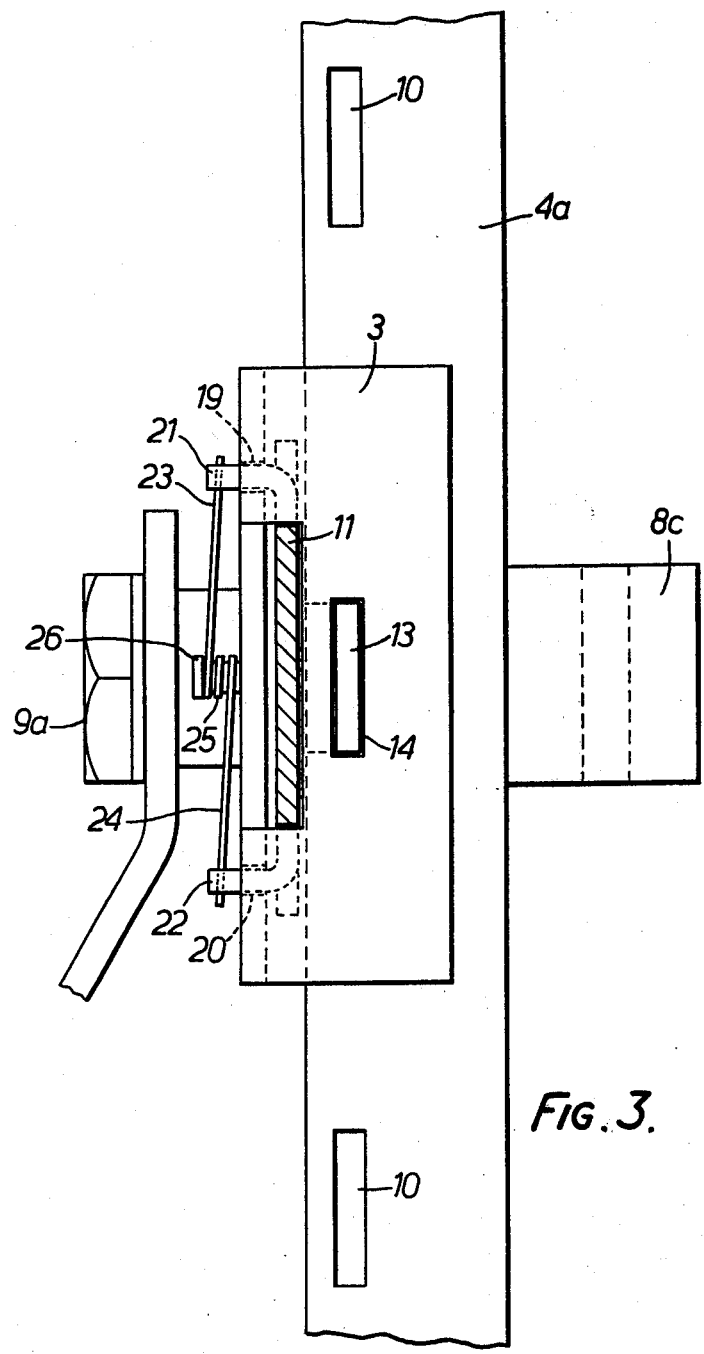
FIG. 3 is a section on the line III—III of FIG. 2.
Figure 4:
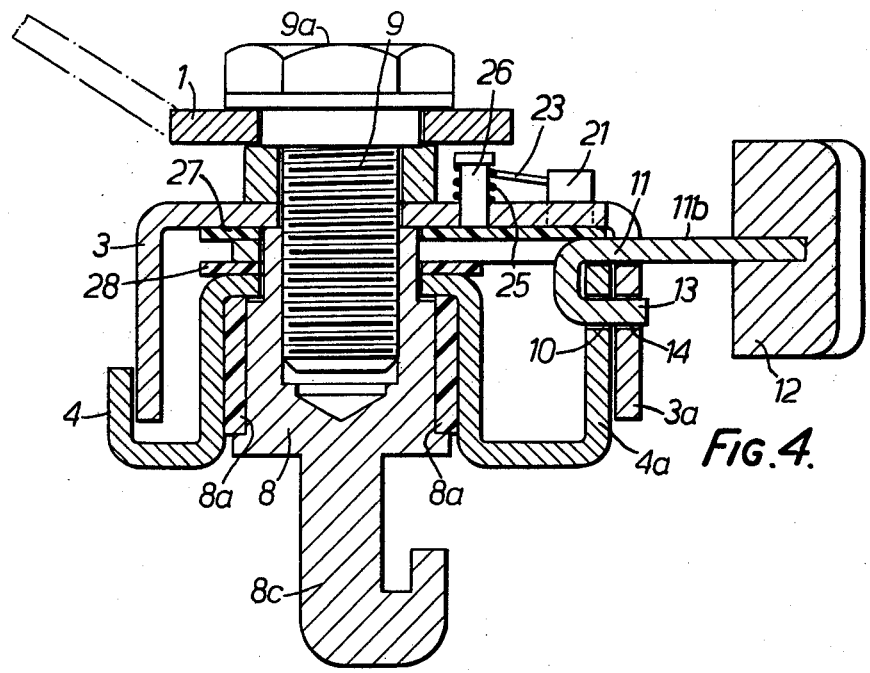
FIG. 4 is a section, to an enlarged scale, on the line IV—IV of FIG. 2, the locked configuration of the device being illustrated.
Figure 5:
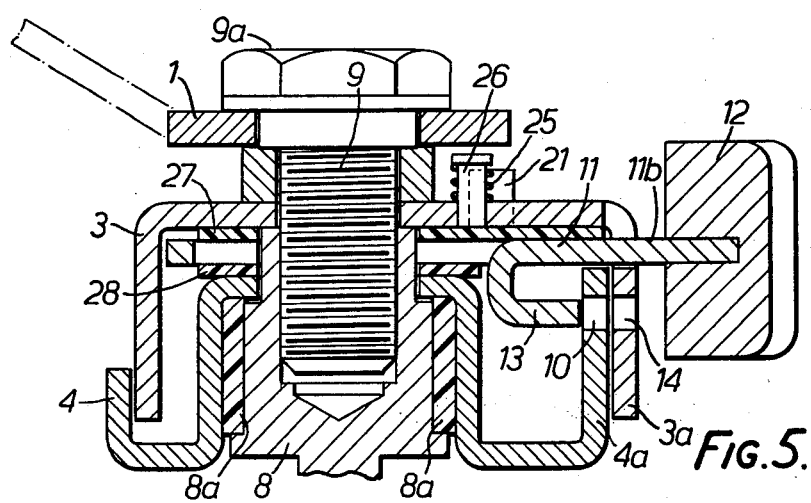
FIG. 5 is a section corresponding to that of FIG. 4, the release configuration of the device being illustrated.

As is apparent from FIGS. 3 to 5, the slide member 3 has a substantially U-shape in cross-section. The guide 4 has the configuration as apparent from FIG. 4, the reference numeral 7 denoting a guide slot with corresponding bonding guide tracks 7a, 7b (FIGS. 1 and 2. A slide piece 8 is movably supported in the guide slot 7 of the guide 4, on the guide surfaces of which inserts of synthetic resin or the like are provided. A tapped bore is formed in the slide piece 8 in which a bolt 9 is screwed which connects the slide member 3 to the slide piece 8. As FIG. 4 of the drawing shows, the shackle 1 serving as the link point of the device lies between the head 9a of the bolt 9 and the slide member 3.

Guide surfaces 8b are provided on the slide piece 8 and lie transversely to the direction of movement thereof (FIG. 2) of which the significance and purpose will be further explained hereinafter. The guide surfaces 8b thus lie on both sides of the tapped bore in the slide piece 8, in relation to which they have the same spacing.

The slide piece 8 carries at its end opposite to the tapped bore a hook-shaped projection 8c (FIG. 4), which for the further securing of the guide engages in a corresponding re-entrant slot within the pillar of the vehicle coachwork.

One limb of the guide 4 is denoted by the reference numeral 4a, in which a row of locking openings 10 is formed. These locking openings 10 form parts of a locking device, of which the essential component is a link 11 mounted in the slide member 3, and displaceable substantially normally to the direction of movement of the same. This link 11 has the form of a substantially rectangular plate 11a, to which is attached a tongue-shaped part 11b, which is secured to a key 12 of the locking device. Guide surfaces 11c are provided on the part 11a of the link 11 extending transversely to the direction of movement of the member 3, each guide surface 11c being applied against the adjacent guide surface 8b of the slide piece 8 (FIG. 2). In this way a satisfactory guidance of a locking member 13 is ensured.

The locking member 13 of the locking device is integral with the link 11, which is bent downwardly from the link 11 to form a hook, the free end of this hook-like bend engaging in the locking position of the slide member 3 in a lock opening 14 (FIG. 4), which is provided in an angled leg 3a of the slide member 3 engaging over and lying parallel to the limb 4a of the guide 4. As is clearly indicated in FIG. 4 of the drawing, the hook-shaped bend part of the lock 13 engages in the locked position of the slide member 3 both in the lock opening 10 of the series of openings as also in the individual lock opening 14 of the angled leg 3a of the slide member 3, so that even at increased loads, for example during vehicle accidents and the like, an accidental release of the locking member 13 and thus of the safety belt is excluded.

An elongated hole 15 is formed in the link 11, through which a respective peg 16 or 17 passes (FIGS. 2 and 6), each connected with the slide member 3. These pegs 16 or 17 engage on both sides positively in respective bores 18 (FIG. 6) provided on both sides of the tapped bore in the slide piece 8.

Slots 19, 20 (FIGS. 2 and 3) are formed in the slide piece 3, by which upwardly extending projections 21 or 22 are guided on the link 11. Each projection 21 or 22 thus serves as an abutment for one section 23 or 24 to a two-part return spring 25 (FIGS. 2 and 3). A pin 26 is arranged between the two slots 19 and 20 which is mounted on the slide member 3 and about which the intermediate portion of the return spring can turn.

Figure 6:
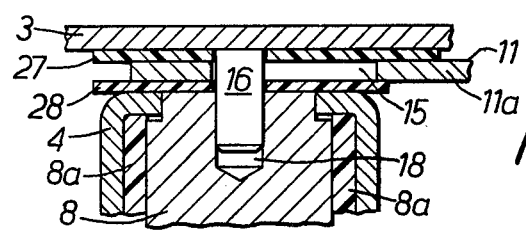
FIG. 6 is a section, to an enlarged scale on the line VI—VI of FIG. 2.

Between the link 11 and the slide member 3 and the link and the slide piece 8 a respective insert 27 or 28 of synthetic resin or the like is provided, in order to improve the friction characteristics between the relatively movable parts (FIGS. 4–6). As FIG. 3 of the drawing indicates, in the locked position of the slide member 3 the lock openings 14 of the angled leg 3a of the slide member 3 are coincident with a lock opening 10 of the series of openings in the limb 4a of the guide 4.

The manner of operation of the adjustment and locking device is as follows:

If the link point, that is the shackle 1, is adjusted with the safety-belt-receiving slot 2 for accommodation to the size and configuration of the relevant vehicle occupant, then the key 12 is moved against the action of the return spring 25 in the direction of the slide member 3, so that the lock 13 is displaced out of the two lock openings 14 and 10.

Subsequently thereto the slide member 3 is displaced into the correct location, in which there is effected again alignment of the locking opening 14 with one of the locking openings of the series of openings in the limb 4a of the guide 4. By release of the key 12 the link 11 is returned to the location illustrated in FIG. 4 under the action of the return spring 25, in which the lock 13 engages in the corresponding locking opening 10 and with the locking opening 14 aligned therewith.

We claim:

1. A device for the adjustment of a link point of a safety belt arranged adjacent the shoulder of a vehicle occupant comprising,
   a slide member having
   an angled leg with a locking opening therein,
   an adjustably lockable link point carried by the slide member,
   a guide mounted within the interior of the vehicle, receiving the link point and having
   a limb with a series of openings therein,
   a slide piece movable in the guide and having a tapped bore therein,
   a bolt screwed in the tapped bore which connects together the slide member and the slide piece,
   a locking device to effect the adjustment and locking of the slide member,
   a return spring biasing the locking device to the locked configuration,
   said locking device being movable substantially perpendicularly to the direction of the movement of the slide member and being connected with the latter, and engaging, in the locked configuration of the slide member in one lock opening of said series of openings, and
   a link movable in the slide member and carrying the locking device which latter in the locked configuration also engages in the said lock opening in the angled leg of the slide member,
   said angled leg of the slide member engaging over the limb of the guide and lying substantially parallel to the latter and
   for the guidance of the locking device a respective guide surface is provided on the slide piece and a guide surface is provided on the link.

2. A device according to claim 1, wherein the slide member carries,
   two pegs,
   the link has two elongate holes, and
   the slide piece has two bores, one on each side of the tapped bore,
   said pegs engaging in a respective one of the said two bores and traversing the elongate holes so that the link can make guided relative sliding movement with respect to the slide member and the guide.

3. A device according to claim 1, wherein said link includes,
projections,
the slide member has corresponding slots through each of which a respective said projection passes, and the device further includes,
a two section return spring, each section abutting one of the said projections.

4. A device according to claim 3, wherein the slide member comprises a pin disposed between the slots, an intermediate section of the return spring being wound around said pin.

5. A device according to claim 1, comprising antifriction inserts disposed respectively between the link and the slide member and between the slide piece and the link.

6. A device according to claim 1, wherein in the locked configuration of the slide member the locking opening in the angled leg of the slide member is aligned with one of the locking openings of the limb of the guide.

* * * * *